United States Patent [19]
Ohkubo

[11] Patent Number: 4,724,720
[45] Date of Patent: Feb. 16, 1988

[54] AUTOMATIC TRANSMISSION

[75] Inventor: Masahiro Ohkubo, Osaka, Japan

[73] Assignee: Kabushiki Kaisha Daikin Seisakusho, Osaka, Japan

[21] Appl. No.: 825,289

[22] Filed: Feb. 3, 1986

[30] Foreign Application Priority Data

Feb. 12, 1985 [JP] Japan .................................. 60-25907

[51] Int. Cl.⁴ ............................................. F16H 47/08
[52] U.S. Cl. ...................................... 74/677; 74/688; 74/730
[58] Field of Search ................. 74/730, 760, 688, 731, 74/732, 677; 192/3.23, 3.24

[56] References Cited

U.S. PATENT DOCUMENTS

| | | | |
|---|---|---|---|
| 2,889,715 | 6/1959 | De Lorean | 74/688 |
| 2,919,604 | 1/1960 | De Lorean | 74/688 X |
| 3,296,891 | 1/1967 | Tuck | 74/688 X |
| 3,557,635 | 1/1971 | Tuck | 74/677 |
| 3,577,805 | 5/1971 | Ohno et al. | 74/688 |
| 4,513,535 | 11/1983 | Hobbs | 74/760 X |

FOREIGN PATENT DOCUMENTS

| | | | |
|---|---|---|---|
| 2627844 | 1/1977 | Fed. Rep. of Germany | 74/688 |
| 23622 | 11/1966 | Japan | 74/730 |
| 52-3975 | 1/1977 | Japan | 74/677 |
| 693084 | 11/1979 | U.S.S.R. | 74/730 |

*Primary Examiner*—Leslie Braun
*Assistant Examiner*—Dwight G. Diehl
*Attorney, Agent, or Firm*—Armstrong, Nikaido, Marmelstein & Kubovcik

[57] ABSTRACT

An automatic transmission combining a stator reversing type torque converter and a speed changer having a planetary gear train composed of first and second planetary gears sharing one planetary carrier in common and a clutch or brake for controlling the planetary gear train, characterized by that a speed-increasing or speed-decreasing mechanism is installed in course of a shaft which transmits a power from said torque converter to a first sun gear or a second sun gear of the speed changer.

2 Claims, 3 Drawing Figures

AUTOMATIC TRANSMISSION

BACKGROUND OF THE INVENTION

1. Industrial Useful Field

This invention relates to an improvement of an automatic transmission, in which a four-element, two-stage stator reversing type torque converter is combined with a speed changer having first and second planetary gears sharing one planetary carrier in common and a clutch or brake for controlling the planetary gear.

2. Prior Art and Its Problem

Generally, in an automatic transmission for use in an automobile, a torque converter and a speed changer are combined. There are several types of speed changer, and a speed changer using a clutch will be accompanied by the following problem.

Namely, in case when a gear ratio of speed changer is to be adjusted finely according to a type of car, a gear ratio of only a part of planetary gears can not be changed and the entire speed changer must be newly designed again, so that a fine adjustment of gear ratio can not be carried out easily.

Further, an engine power transmission zone of torque convertor becomes smaller as the torque converter gets nearer to a high speed ratio zone and a torque transmission capacity of the torque convertor therefore becomes smaller, so that it is impossible to make the best use of an engine performance.

OBJECT OF THE INVENTION (1) An object of this invention is to provide an automatic transmission, in which a fine adjustment of a gear ratio at a high-speed speed-change zone can be carried out easily without changing a planetary gear train.

(2) Another object of this invention is to provide an automatic transmission which can widen an useful range of engine power at a high-speed speed-change zone.

COMPOSITION OF THE INVENTION (1) Technical measure

In an automatic transmission combining a stator reversing type torque converter and a planetary gear train speed changer composed of first and second planetary gears sharing one planetary carrier in common, an automatic transmission providing a speed-increasing or speed-decreasing mechanism is provided in course of a shaft which transmits a power from said torque converter to a first sun gear or a second sun gear of the speed changer.

(2) Function

A power from engine is given to the planetary gear train through the speed-increasing or speed-decreasing mechanism, at the same time the power from engine is given from a turbine to the planetary gear train through fluid of the torque converter, these power inputs through two routes are compounded through means of a differential function of the planetary gear train, an input rotation from the engine to the speed-changer is adjusted by previously changing a gear ratio of the speed-increasing or speed-decreasing mechanism, thus an output rotation being adjusted.

DETAILED DESCRIPTION OF THE INVENTION

Embodiment

Figure 1:
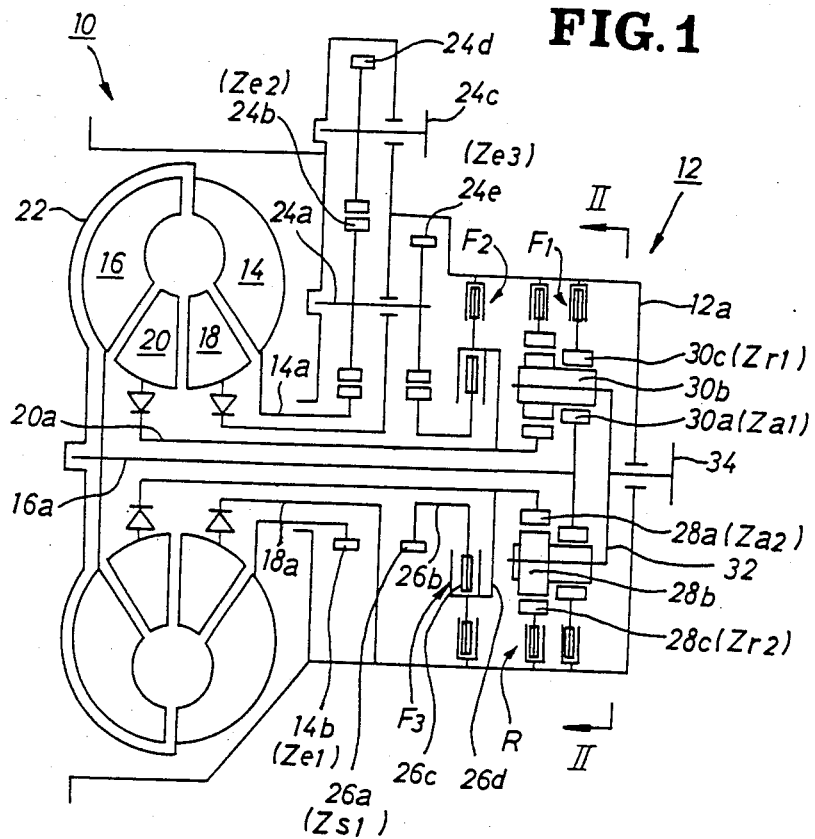
FIG. 1 is a schematic structural vertical sectional view showing a first embodiment of an automatic transmission according to this invention.
Figure 2:
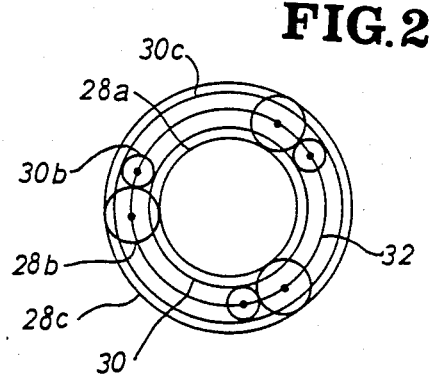
FIG. 2 is a sectional view taken on a line II—II of FIG. 1.

In the first embodiment applied to an automatic transmission for commercial car such as a truck etc. for example, 10 is a four-element, two-stage type torque converter. A speed changer 12 with forward three-speeds and backward one-speed, for example, is coupled to a forward stage of the torque converter. The speed changer 12 includes a planetary gear train composed of a first planetary gear 30b and a second planetary gear 28b sharing one planetary carrier 32 in common and a clutch F3 or brakes F1, F2 & R controlling the planetary gear train.

The automatic transmission consists of the speed changer 12 and the torque converter 10.

The torque converter 10 is composed of a pump 14, a turbine 16, a fixed stator 18 and a reversing stator 20, thus an engine power being transmitted from a flywheel 22 to the pump 14.

The turbine is coupled to a turbine shaft 16a and the reversing stator 20 is coupled to a stator shaft 20a. The fixed stator 18 is fixed to a housing by means of a shaft 18a and the pump 14 is connected to a pump shaft 14a. A ring gear 14b is installed at a speed changer side end of the pump shaft 14a and a tooth number of the ring gear 14b is settled as Ze1.

The ring gear 14b meshes with a gear 24b (tooth number: Ze2) of an intermediate shaft 24a and the gear 24b further meshes with a gear 24d of a PTO shaft 24c (Power Take Off). A gear 24e (tooth number: Ze3) is installed at the speed changer side end of the intermediate shaft 24a. The gear 24e meshes with a ring gear 26a and the ring gear 26a (tooth number: Zs1) is fixed to a shaft 26b. These gear trains comprise a speed-increasing or speed-decreasing mechanism.

A clutch disc 26c of the clutch F3 for third-speed is fixed to the other end of the shaft 26b. A clutch cover 26d of the clutch F3 is connected to the stator shaft 20a. The brake F2 for second-speed is disposed at an external side of the clutch cover 26d, and the brake F2 is fixed to a housing 12a.

A second sun gear 28a (tooth number: Za2) is fixed to an end portion of the stator shaft 20a, and a first sun gear 30a (tooth number: Za1) is fixed to an end portion of the turbine shaft 16a. The first sun gear 30a meshes with a first planetary gear 30b, and the second sun gear 28a meshes with the second planetary gear 28b.

A first ring gear 30c (tooth number: Zr1) is installed at an external side of the first planetary gear 30b, and the first ring gear 30c and the first planetary gear 30b mesh each other. The first brake F1 for first-speed fixed to the housing 12a is disposed at a further external side of the first ring gear 30c.

A second ring gear 28c (tooth number: Zrz) meshes with the second planetary gear 28b at its external side, and the brake R for backward drive is disposed at a further external side of the second ring gear 28c. The brake R is fixed to the housing 12a.

The first planetary gear 30b and the second planetary gear 28b are held on a carrier 32 so that they may mesh each other freely rotatably.

An output shaft 34 is coupled to the carrier 32.

Function will be described hereunder. First, under a first-speed mode wherein only the brake F1 is switched to ON and the other brakes and clutch are switched to OFF; only the first ring gear 30c is interconnected to the housing so that a power from engine is transmitted from the pump 14 through fluid to the turbine 16, further from the turbine shaft 16a to the first sun gear 30a, and is outputted to the carrier 32 through the first planetary gear 30b as a reaction force caused by the fixed first ring gear 30c; and at the same time a reversing force, which is transmitted from the pump 14 through the fluid to the turbine 16, the reversing stator 20, then from the stator shaft 20a to the second sun gear 28a, is changed its rotation direction through the second planetary gear 28b and the first planetary gear 30b to the carrier 32 in the same manner as above, then decelerated and outputted. A reduction ratio in this instance can be set to an arbitral value of more than 2.

Under a second-speed mode wherein only the brake F2 is switched to ON and the other brakes and clutch are switched to OFF; only the clutch cover 26d is interconnected to the housing 12a and the reversing rotation of the stator shaft 20a stops, so that the power from the torque converter 10 is inputted from the turbine shaft 16a to the first sun gear 30a and is decelerated and outputted through the first planetary gear 30b and the second planetary gear 28b to the carrier 32 as a reaction force caused by the fixed second sun gear 28a. A reduction ratio in this instance can be set to an arbitral value between 1 and 2.

Under a third-speed mode wherein only the clutch F3 is switched to ON; the stator shaft 20a rotates integrally with the shaft 26b, so that the engine power is transmitted to the speed changer 12 by way of two routes: i.e. a route through the turbine shaft 16a and a route through the pump 14, the pump shaft 14a, the ring gear 14b, the gear 24b, the intermediate shaft 24a, the gear 24e, the ring gear 26a, the shaft 26b, the clutch F3 and the stator shaft 20a. Since rotations of the stator shaft 20a and the turbine shaft 16a are compounded and transmitted to the carrier 32 by means of the differential function of the both planetary gears 28b and 30b of the speed changer 12, a reduction ratio of the carrier 32 is changed by an amount of increased or decreased speed resulted from the ring gear 14b, the gears 24a & 24e and the ring gear 26a. Namely, in said intermediate speed change mechanism, a reduction ratio of third-speed will become less than 1.0 i.e. so-called "Over-drive" when a speed of the pump 14 is increased, and the reduction ratio of the third-speed will become about 1.1 when that speed is decreased.

Accordingly, a fine-adjustment of the third-speed reduction ratio becomes possible by only changing the reduction ratio between the gear 24e and the ring gear 26a, which does not affect the reduction ratio of the PTO shaft 24c.

When only the brake R is switched to ON, the second ring gear 28c is fixed to the housing, the engine power is transmitted from the pump 14 through the fluid to the turbine 16 and further from the turbine shaft 16a to the first sun gear 30a, and is changed its rotational direction to be outputted to the carrier 32 through the first planetary gear 30b and the second planetary gear 28b as a reaction force caused by the fixed second ring gear 28c, and at the same time a reversing force, which is transmitted from the pump 14 through the fluid to the turbine 16, the reversing stator 20 and further from the stator shaft 20a to the second sun gear 28a, is similarly decelerated and outputted to the carrier 32 through the second planetary gear 28b.

Reduction ratios in the above respective speed modes are shown in Table 1. Incidentally, the O mark in this Table shows the switching ON of the clutch.

TABLE 1

| Speed mode | $F_1$ | $F_2$ | $F_3$ | R | Reduction ratio |
|---|---|---|---|---|---|
| Forward | | | | | |
| 1st | O | | | | $\dfrac{Z_{a_1} + Z_{r_1}}{Z_{a_1}} > 2$ |
| 2nd | | O | | | $2 > \dfrac{Z_{a_1} + Z_{a_2}}{Z_{a_1}} > 1$ |
| 3rd | | | O | | $\dfrac{Z_{a_1} + \dfrac{Z_{a_2}}{Z_{\theta_1}} \times \dfrac{Z_{s_1}}{Z_{\theta_3}} \times Z_{a_2}}{Z_{a_1} + Z_{a_2}}$ |
| Backward | | | | O | $-\dfrac{Z_{r_2} - Z_{a_1}}{Z_{a_1}}$ |

Effect of the Invention

According to the automatic transmission of the present invention as described above, in the automatic transmission combining the stator reversing type torque converter and the speed changer having the planetary gear train composed of the first and second planetary gears sharing one planetary carrier in common and the clutch or brakes for controlling the planetary gear train; the speed-increasing or speed-decreasing mechanism is installed in the course of the shaft which transmits the power from said torque converter to the first sun gear or the second sun gear of the speed changer, so that the reduction ratio of the third speed can be easily and finely adjusted by changing the reduction ratio between the ring gear 26a and the gear 24e in case of said first embodiment. Consequently, the reduction ratio (only the third-speed for the first embodiment) can be adjusted finely without changing a structure and a design of the automatic transmission to a large extent depending on the application of vehicle, and the applicable range of automatic transmission to vehicle can therefore be widened.

Further, in a speed changing stage (only the third-speed for the first embodiment) wherein the speed-increasing or speed-decreasing mechanism operates, the engine power is transmitted to the speed changer 12 through the both routes i.e. from the turbine shaft 16a and from the pump shaft 14a, so that a torque transmission capacity increases to have the engine fully exerts its torque characteristics and to improve a power transmission efficiency. As the result, a vehicle fuel consumption can be minimized.

Figure 3:
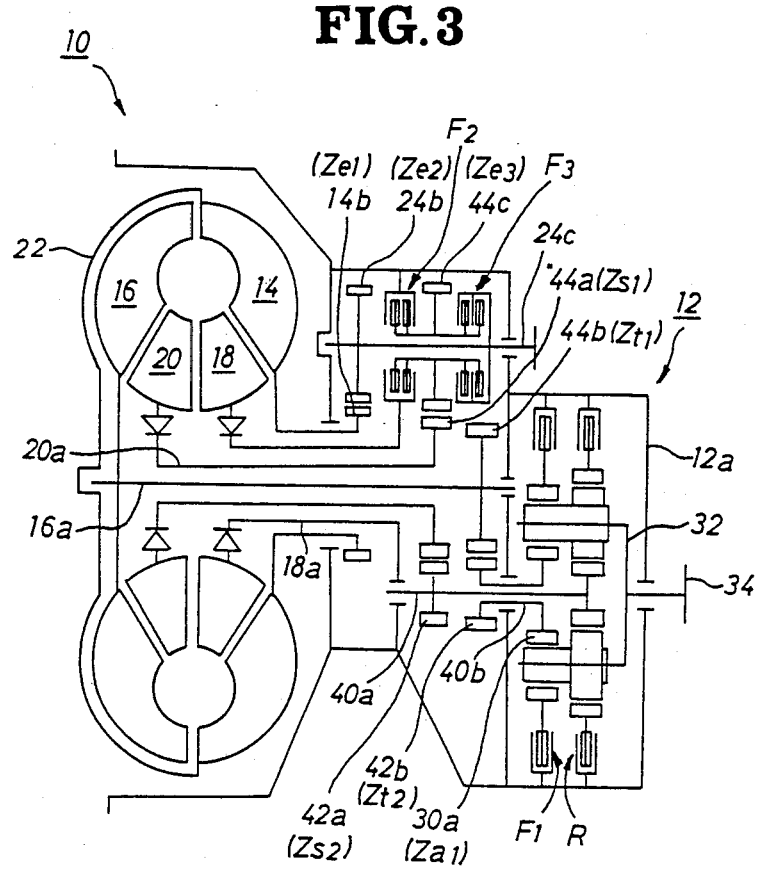
FIG. 3 is a schematic structural vertical sectional view showing a second embodiment.

Another embodiment (1) A second embodiment, in which reduction ratios for all the speed changing stages are adjusted finely, will be described hereunder referring to FIG. 3. Incidentally, a part of FIG. 3 shown by the same symbol as FIG. 1 indicates a part the same as or equivalent to that part.

Offset shafts 40a & 40b are installed in the speed changer 12, and a gear 42a (tooth number: Zs2) and a gear 42b (tooth number: Zt2) are fixed to the both shafts 40a & 40b respectively.

A gear 44b (tooth number: Zt1) meshing with the gear 42b is fixed to an end portion of the turbine shaft 16a, and a gear 44a (tooth number: Zs1) meshing with the gear 42a is fixed to the stator shaft 20a. Further, the gear 44a meshes with the gear 44c (tooth number: Ze3).

In the above second embodiment, the speed-increasing or speed-decreasing mechanism is equipped to both the turbine shaft 16a and the stator shaft 20a so that the reduction ratio can be finely adjusted in all the speed changing stages. The reduction ratios in respective speed changing stages are shown in Table 2.

TABLE 2

| Speed mode | $F_1$ | $F_2$ | $F_3$ | R | Reduction ratio |
|---|---|---|---|---|---|
| Forward | | | | | |
| 1st | O | | | | $\frac{Zt_2}{Zt_1} \times \frac{Za_1 + Zr_1}{Za_1}$ |
| 2nd | | O | | | $\frac{Zt_2}{Zt_1} \times \frac{Za_1 + Za_2}{Za_1}$ |
| 3rd | | | O | | $\frac{Za_1 \times \frac{Zt_2}{Zt_1} + Za_2 \times \frac{Z\theta_2}{Z\theta_1} \times \frac{Zs_2}{Zs_1}}{Za_1 + Za_2}$ |
| Backward | | | | O | $-\frac{Zt_2}{Zt_1} \times \frac{Zr_2 - Za_1}{Za_1}$ |

This second embodiment is suitable for an automatic transmission for a specially-equipped vehicle such as a tank lorry, a crane etc. which is preferable to provide fine adjustment of reduction ratios of the all speed changing stages.

(2) Further, this invention is applicable not only to the forward three-speed transmission but speed changing stages of forward four-speed may also be available by providing clutches in the course of the turbine shaft 16a and the stator shaft 20a. Moreover, a lock-up clutch may be provided between the turbine 16 and the flywheel 22.

(3) This invention is applicable not only to an automatic transmission for truck but also to a passenger car which is not equipped with the power take-off mechanism.

What is claimed is:

1. an automatic transmission combining a stator reversing type torque converter and speed changer having first and second sun gears comprising:
   (a) a planetary gear train composed of first and second planetary gears sharing one planetary carrier in common;
   (b) a clutch and and requisite brakes to control the planetary gear train; and
   (c) a speed-increasing or speed-decreasing mechanism is installed both in between a turbine shaft coupled to a turbine of the stator reversing type torque converter and the first sun gear of the speed changer, and in between a stator shaft coupled to a reversing stator and the second sun gear of the speed changer.

2. An automatic transmission combining a stator reversing type torque converter and a speed changer comprising:
   (a) a planetary gear train composed of first and secondary planetary gears sharing one planetary carrier in common;
   (b) a clutch and requisite brakes to control the planetary gear train;
   (c) a speed-increasing or speed-decreasing mechanism mounted on a shaft which transmits power from said torque converter to a first sun gear or a second sun gear of the speed changer;
   (d) a PTO shaft taking off a part of the power from said speed increasing or decreasing mechanism;
   (e) a clutch for third-speed installed between said speed-increasing or speed-decreasing mechanism and a first stator of the torque converter;
   (f) a brake for second-speed is provided on an outer periphery of the clutch for third-speed;
   (g) a backward brake is further provided on an outer periphery of a second ring gear meshing with said second planetary gear; and
   (h) a brake for first-speed is provided on an outer periphery of a first ring gear meshing with said first planetary gear.

* * * * *